(12) United States Patent
Smith et al.

(10) Patent No.: US 11,384,816 B2
(45) Date of Patent: *Jul. 12, 2022

(54) GEARBOX WITH INTERNAL DIAPHRAGM

(71) Applicant: Universal Motion Components Co., Inc., Costa Mesa, CA (US)

(72) Inventors: William F. Smith, Newport Beach, CA (US); Raymond Lee Call, II, Mission Viejo, CA (US)

(73) Assignee: UNIVERSAL MOTION COMPONENTS CO., INC., Costa Mesa, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/708,290

(22) Filed: Dec. 9, 2019

(65) Prior Publication Data

US 2020/0256428 A1    Aug. 13, 2020

Related U.S. Application Data

(63) Continuation of application No. 15/601,774, filed on May 22, 2017, now Pat. No. 10,502,283.

(Continued)

(51) Int. Cl.
*F16H 1/16* (2006.01)
*A01G 25/09* (2006.01)
(Continued)

(52) U.S. Cl.
CPC .............. *F16H 1/16* (2013.01); *A01G 25/09* (2013.01); *A01G 25/092* (2013.01); *F15B 1/265* (2013.01);
(Continued)

(58) Field of Classification Search
CPC ........ F16H 1/16; F16H 57/027; F16H 57/039; F16H 55/22; F16H 2057/02056; A01G 25/09; A01G 25/092; F15B 1/265
See application file for complete search history.

(56) References Cited

U.S. PATENT DOCUMENTS 2,175,047 A    10/1939    Acker
3,123,109 A    3/1964    Bork
(Continued)

FOREIGN PATENT DOCUMENTS

CN    101149106 A    3/2008
CN    101970900 A    2/2011
(Continued)

OTHER PUBLICATIONS

International Search Report and Written Opinion of the International Searching Authority for International Application No. PCT/EP2017/033645, dated Jul. 24, 2017, in 14 pages.

*Primary Examiner* — Thomas C Diaz
(74) *Attorney, Agent, or Firm* — Knobbe, Martens, Olson & Bear, LLP

(57) ABSTRACT

Some embodiments of a gearbox for an irrigation system can comprise a housing, a worm gear within the housing, a bull gear within the housing and configured to be engaged with the worm gear, a diaphragm, and a vent. The diaphragm can define a chamber configured for expansion and contraction and configured to be positioned inside the housing to relieve pressure build-up within the housing. The vent can be configured to allow air to flow between the atmosphere and the chamber.

14 Claims, 15 Drawing Sheets

Related U.S. Application Data

(60) Provisional application No. 62/340,420, filed on May 23, 2016.

(51) Int. Cl.

| | | |
|---|---|---|
| *F16H 57/04* | (2010.01) | |
| *F15B 1/26* | (2006.01) | |
| *F16H 57/039* | (2012.01) | |
| *F16H 57/027* | (2012.01) | |
| *F16H 55/22* | (2006.01) | |
| *F16H 57/01* | (2012.01) | |
| *F16H 57/02* | (2012.01) | |

(52) U.S. Cl.
CPC ......... *F16H 57/027* (2013.01); *F16H 57/039* (2013.01); *F16H 57/0498* (2013.01); *F16H 55/22* (2013.01); *F16H 2057/012* (2013.01); *F16H 2057/02056* (2013.01)

(56) References Cited

U.S. PATENT DOCUMENTS

| | | | |
|---|---|---|---|
| 4,261,218 A | 4/1981 | Eagan, Sr. | |
| 4,759,260 A | 7/1988 | Lew | |
| 4,987,796 A | 1/1991 | Kaier et al. | |
| 5,125,291 A | 6/1992 | Makita et al. | |
| 5,709,084 A | 1/1998 | Krantz | |
| 6,007,069 A | 12/1999 | Sadowski | |
| 6,237,863 B1 * | 5/2001 | Smith .................. | A01G 25/092 239/722 |
| 6,354,975 B1 | 3/2002 | Thoma | |
| 6,398,223 B1 | 6/2002 | Radosav | |
| 6,595,887 B2 | 7/2003 | Thoma | |
| 6,820,822 B2 * | 11/2004 | Daniels .................. | A01G 25/09 239/159 |
| 6,971,277 B2 | 12/2005 | Schlenker | |
| 7,455,300 B2 | 11/2008 | Dudman | |
| 8,042,422 B2 | 10/2011 | Meyer | |
| 8,826,774 B1 * | 9/2014 | Craig .................... | F16H 57/027 74/606 R |
| 8,931,268 B1 * | 1/2015 | Langenfeld .......... | B60K 17/105 60/485 |
| 9,003,912 B2 | 4/2015 | Daniel et al. | |
| 9,046,114 B1 | 6/2015 | Probst et al. | |
| 9,291,254 B2 | 3/2016 | Daniel et al. | |
| 9,469,191 B1 | 10/2016 | Langenfeld | |
| 9,845,857 B2 | 12/2017 | Kato et al. | |
| 10,352,398 B2 | 7/2019 | Smith et al. | |
| 10,502,283 B2 | 12/2019 | Smith et al. | |
| 2004/0025614 A1 | 2/2004 | Schlenker | |
| 2006/0170165 A1 | 8/2006 | Meyer | |
| 2010/0186548 A1 | 7/2010 | Wegner et al. | |
| 2010/0275708 A1 | 11/2010 | Daniel et al. | |
| 2010/0307273 A1 | 12/2010 | Adcock et al. | |
| 2014/0373656 A1 | 12/2014 | Daniel et al. | |

FOREIGN PATENT DOCUMENTS

| | | |
|---|---|---|
| CN | 204403342 U | 6/2015 |
| CN | 105556173 A | 5/2016 |
| DE | 3337059 A1 | 5/1984 |
| FR | 2604313 A1 | 3/1988 |
| FR | 2604313 B1 | 10/1990 |

\* cited by examiner

GEARBOX WITH INTERNAL DIAPHRAGM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

The present invention relates generally to the field of driveline components, for example driveline components used in irrigation systems.

Description of the Related Art

Worm wheel gearboxes have a worm gear that engages a bull gear. Such gearboxes are especially useful where low speed and high torque is desirable. Often, the worm gear is disposed on an input or drive shaft and the bull gear is linked to an output shaft. The gearbox can also be sealed. These worm wheel gearboxes are commonly used, for example, in agricultural irrigation systems and potato pilers.

Irrigation systems are widely used throughout the world to provide water for agricultural purposes in arid regions. Such systems include center pivot irrigation and lateral move systems. Typically, such systems include a series of spaced apart support towers connected by truss sections that support an elevated water distribution pipe between the towers. The trusses are linked together, enabling such irrigation systems to stretch to lengths of a thousand yards or more. In center pivot systems, the water distribution pipe extends radially from a central pivot communicating with a pressurized water supply. In lateral or linear move irrigation systems, the water distribution pipe extends laterally from a canal feed or hose drag system that provides a pressurized water supply.

Water passing through the distribution pipe is forced out through a number of sprinkler heads, spray guns, drop nozzles, and the like, spaced along the length of the pipe. Each tower in the system is supported on wheels that are driven at low speeds to move the tower in a circular path about the central pivot, or a linear path in the case of lateral move systems, to thereby irrigate a tract of land.

A number of drive assemblies have been developed for driving the support wheels of sprinkler irrigation systems. The most common drive assembly includes an electric motor connected to a center gear drive assembly, a first wheel gear assembly coupled to the center gear drive assembly by a first drive shaft, and a second wheel gear assembly coupled to the opposite side of the center gear drive assembly by a second drive shaft. Each of the first and second drive shafts typically has a driveline coupler at each end that allows the shafts to be quickly and easily pulled apart and put back together to facilitate field maintenance and/or towing from field to field.

The wheel gear assemblies generally include a wheel connected to a gearbox. The gearbox can be a sealed worm wheel gearbox that is provided having a worm disposed on a driveshaft. The worm engages a bull gear within the gearbox. The motor can drive a shaft which acts as the input shaft to the worm wheel gearbox. The bull gear is linked to an output shaft. The output shaft has an output flange which connects to the driven wheel. Rotation of the input shaft is thus transmitted via the gearbox to the output shaft, driving the wheels of the irrigation system.

A typical irrigation watering system has a number of such support wheels and each wheel or pair of wheels typically is driven by a motor and worm wheel gearbox as described. Worm wheel gearboxes are especially advantageous in this environment because once the drive motor stops, the worm and bull gear combination allow very little additional movement such as coasting. Thus, the irrigation system will remain in its position even if it is on a hill or other unlevel surface.

The farm environment tends to be wet, muddy, silty, and dusty. Thus, these gearboxes are generally sealed to prevent contamination of the gearbox contents, such as the oil contained therein.

Worm wheel gearboxes are also commonly used in potato pilers. A potato piler comprises a conveyor disposed on a wheeled frame. To enable even piling of potatoes, the conveyor must be moved short, precise distances during operation. Potato pilers thus typically comprise a motor which rotatably drives a shaft and a worm wheel gearbox that transmits the shaft rotation to drive the wheels of the potato piler. This enables the potato piler to be moved short, precise distances when piling potatoes.

SUMMARY

There exists a continuing need to provide improvements in gearboxes and in worm wheel gearboxes. For example, there exists a need to improve the ability of gearboxes to appropriately deal with changes in temperature and internal pressure. Proper seals should be maintained to prevent contamination of the gearbox contents.

Some embodiments of a gearbox for an irrigation system can comprise a housing, a worm gear within the housing, a bull gear within the housing and configured to be engaged with the worm gear, a diaphragm, and a vent. The diaphragm can define a chamber configured for expansion and contraction and configured to be positioned inside the housing to relieve pressure build-up within the housing. The vent can be configured to allow air to flow between the atmosphere and the chamber.

There also exists a need to introduce sensors into gearboxes in a reliable way that will not cause the gearbox to leak oil.

DETAILED DESCRIPTION

Figure 1A:
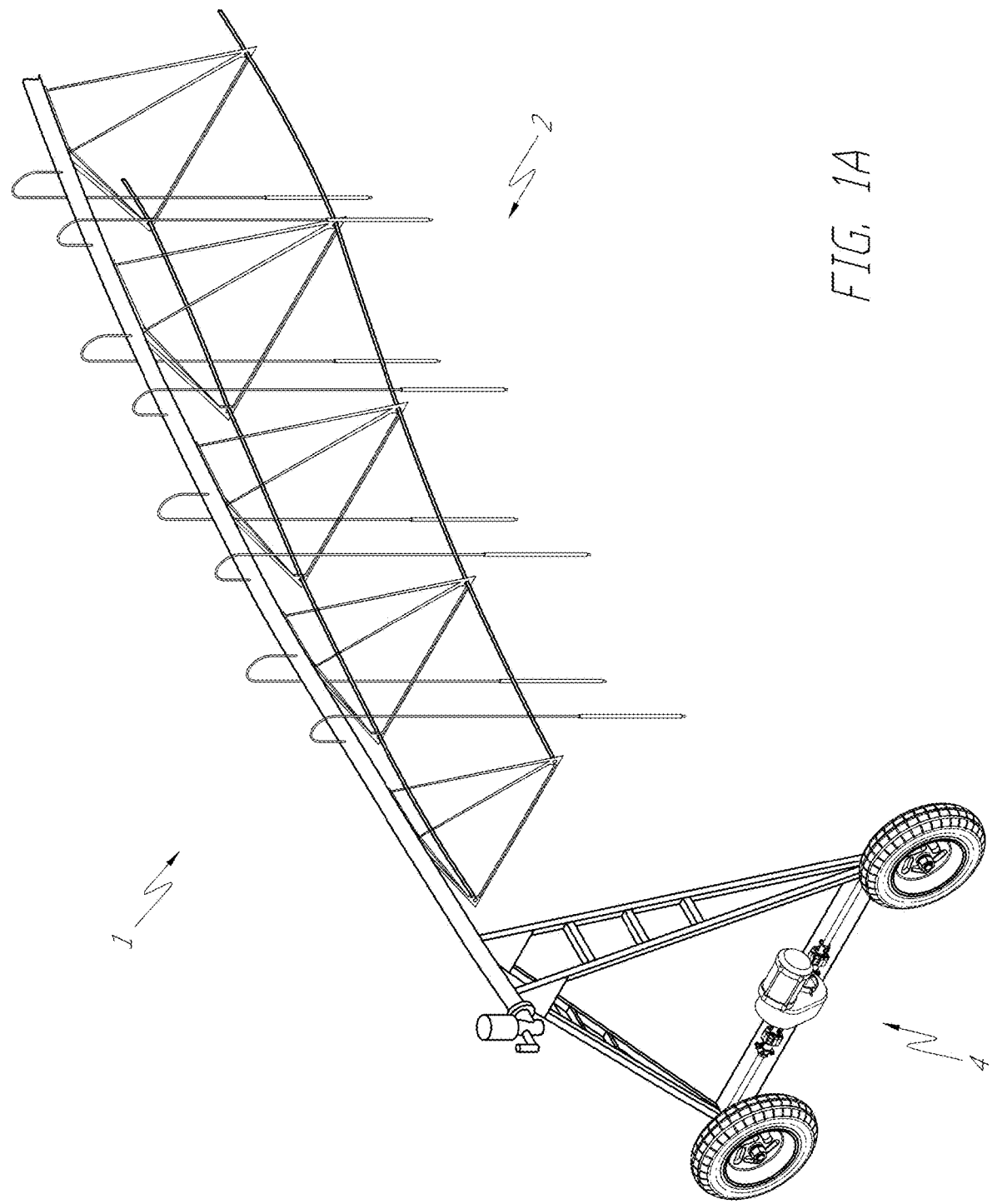
FIG. 1A illustrates part of an irrigation system with a drive assembly.
Figure 1B:
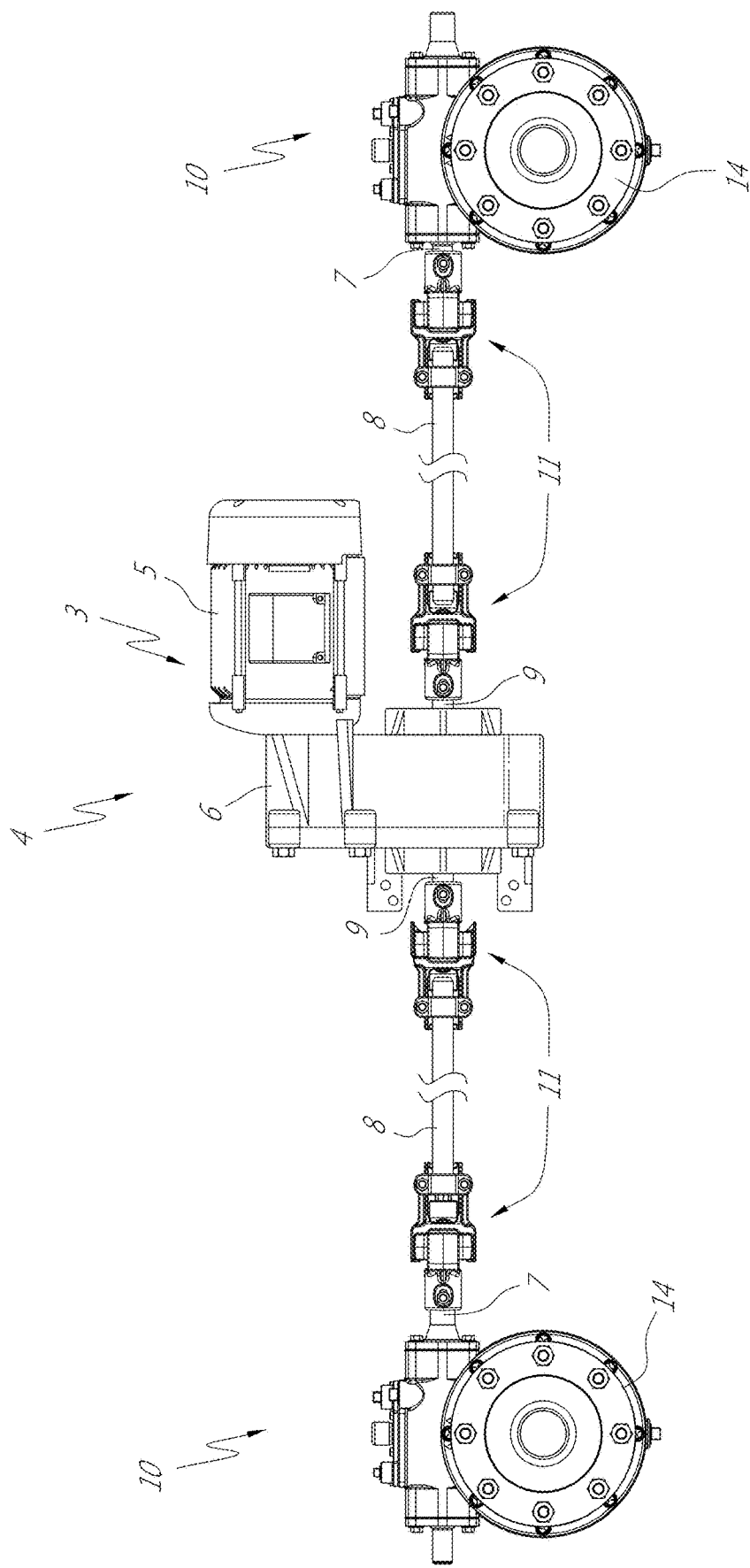
FIG. 1B shows part of a drive assembly with a center drive, wheel gearboxes, drive shafts, and driveline couplers.
Figure 2:
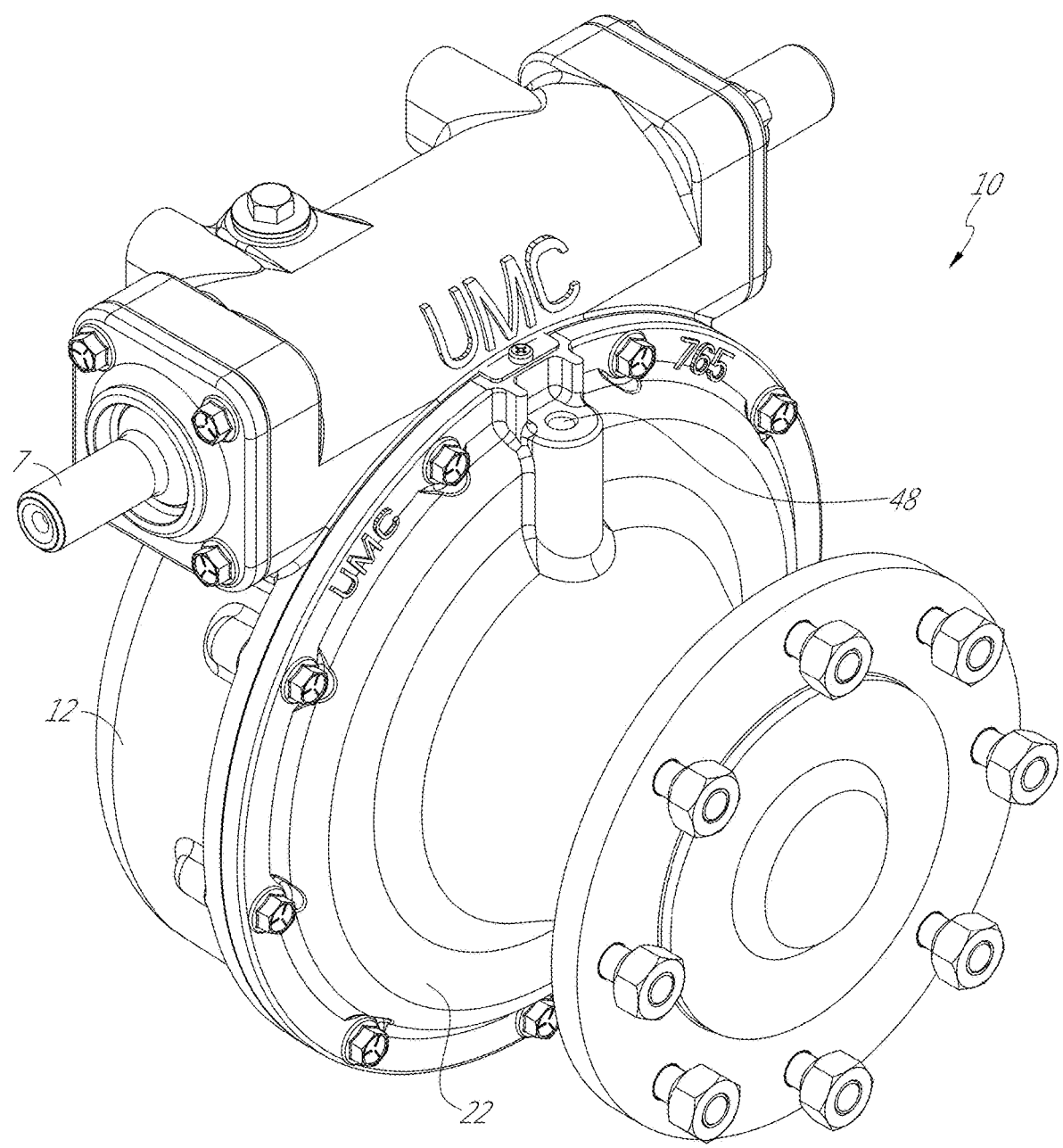
FIG. 2 illustrates an embodiment of a wheel gearbox.
Figure 3:
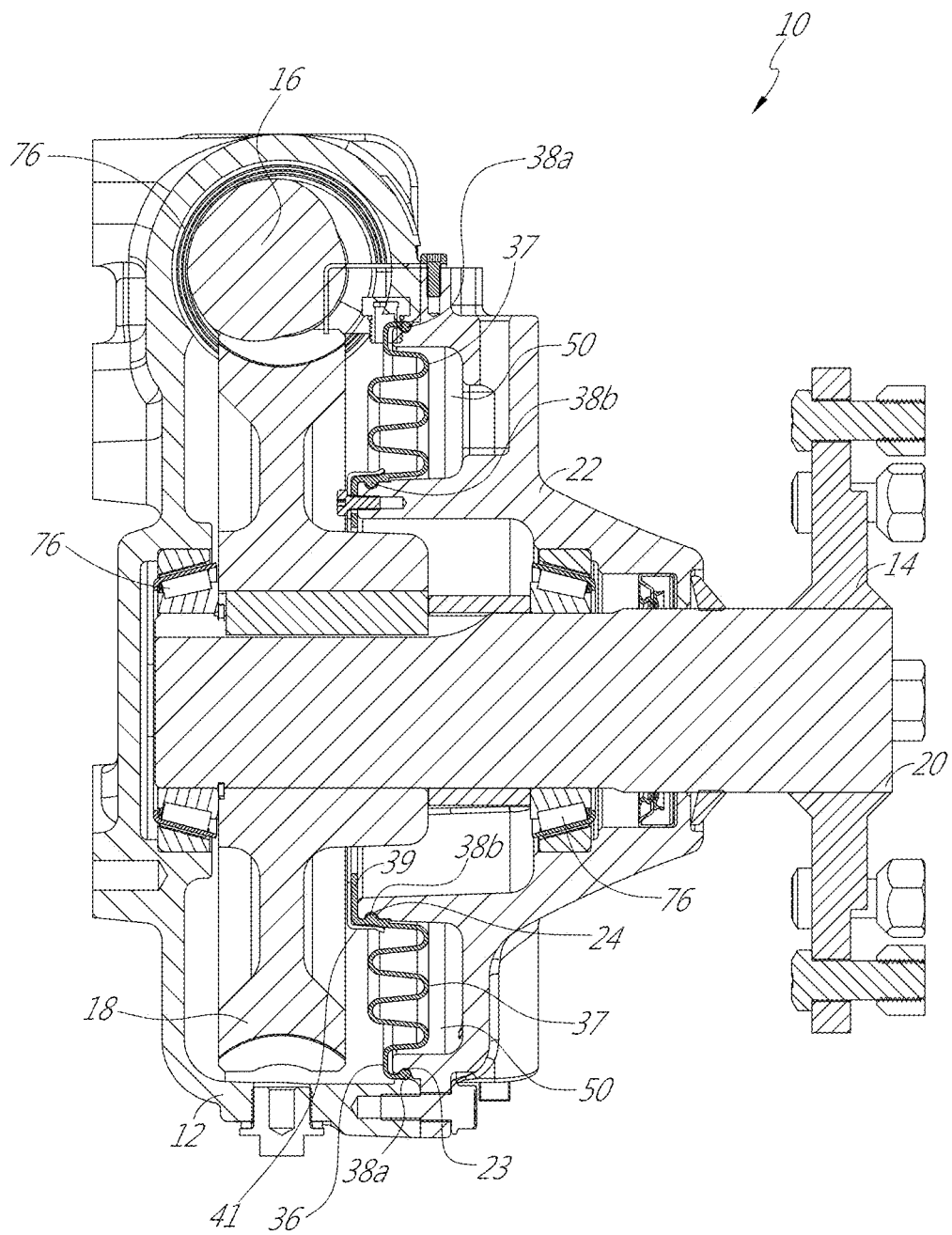
FIG. 3 illustrates a cross section of the gearbox of FIG. 2.

An irrigation system 1 for providing water for agricultural purposes and as partially shown in FIG. 1A, can have a water piping and delivery system 2 and a drive assembly 4. An embodiment of a drive assembly 4 is shown in more detail in FIG. 1B. A drive assembly 4 can have a center drive 3, a wheel gearbox 10, a shaft or drive shaft 8 and one or more driveline couplers 11. A center drive 3 can have motor 5 connected to a gearbox 6 to deliver a torque to a drive shaft 8. Driveline couplers 11 are shown connecting the drive shafts or shafts 7, 9 of the gearboxes 10 and center drive 3 to the drive shafts 8. Drive shafts 8 typically have a driveline coupler 11 at each end to allow the shafts 8 to be quickly and easily pulled apart and put back together to facilitate field maintenance and/or towing from field to field.

In use, hub 14 on the gearbox 10 can connect with a wheel. The center drive 3 can drive the drive shaft 8 which in turn can drive the gearbox 10. The gearbox 10 can transfer the motion of the turning drive shaft 8 into a rotational motion at the hub 14 to turn the wheel and drive an irrigation system 1. The gearbox 10 can be either non-towable or towable. The wheel gearbox 10 can have a handle (not shown) that can be used to disengage the gears inside the gearbox to allow free rotation of the hub 14. Alternatively, the wheel gearbox could be fitted with a towable hub.

In a towable state, a driveline coupler 11 can be separated so that the wheel gearbox 10 can be rotated or pivoted to a new orientation. Also, the handle can be used to disengage the gears inside the wheel gearbox 10. In this state, the wheel gearbox 10 is no longer connected to the center drive 6 and is free to rotate. In a typical operation a farmer or user can attach a system 1 in a towable state to a tractor or truck and tow the system to a new location, such as to a different field. Examples of a towable wheel gearbox can be found in U.S. Pat. No. 6,237,863, entitled "Disengageable Worm Wheel Gearbox," which is incorporated herein by reference in its entirety and made a part of this specification.

Referring next to FIGS. 2-6, a worm wheel gearbox 10 is shown in more detail. The worm wheel gearbox 10 preferably comprises a gearbox housing 12, a driveshaft 7 having a worm gear 16 disposed thereon, and a bull gear 18 in driving relation with an output shaft 20. The worm gear 16 engages the bull gear 18 within the gearbox housing 12. The output shaft 20 is connected to an output flange or hub 14 which can be attached to a wheel.

The bull gear 18 and output shaft 20 are arranged in the gearbox housing 12 to provide for transfer of torque. A gearbox cover 22 is attached to the housing 12. The worm wheel gearbox 10 can also include various other components, such as bearings 76, bearing cups, shims, spacers, o-rings, seals 30, gaskets, etc.

A gear oil bath can lubricate the contents of the gearbox 10. For example, the gearbox 10 can be substantially full of oil. In other embodiments, the gearbox 10 can be less than full of oil, i.e. 10-90%, 25-75%, or 50% full. In some embodiments, the gearbox 10 can have an air gap, such as a 1 inch air gap. It can be beneficial to reduce or eliminate the air gap inside the gearbox to reduce the possibility of condensation within the gearbox. The gearbox can hold a predetermined amount of oil, such as 1 gallon or 4 quarts of oil. Other embodiments can hold more or less than this, such as 3 quarts, 5 quarts, and 8 quarts. As mentioned, the predetermined amount of oil can substantially fill the gearbox or leave an air gap.

The gearbox 10 can include a drain plug 26 and a fill plug 28. The fill plug 28 can be used to add a lubricant, such as oil, into the gearbox 10. The drain plug 26 can be used to drain some or all of the lubricant, or other liquids, such as water, from the gearbox 10. It can be undesirable to allow water, such as the water from condensation, to build up within the gearbox 10. The drain plug 26 can be used to drain this water. It can also be used, for example, to change the oil.

The drive assembly 4, and therefore the gearbox 10, is often used in a dirty and corrosive environment. As discussed, a gearbox 10 can be used on irrigation equipment 1 in fields to provide water to crops and the like. In this environment, the gearbox 10 can be exposed to the elements for extended periods of time. The irrigation equipment 1 can travel through dirt and rocks and the gearbox 10 can likewise be affected by these elements. The irrigation equipment 1 itself can be constantly wet as water is provided to the field. Also, irrigation equipment 1 is often used in hot climates. Thus, a gearbox 10 can be exposed to direct sunlight, and constantly wetted and then dried by the sun. In addition, the mornings and nights can be very cold. These conditions can be highly corrosive to the irrigation equipment 1 and can expose the components to extreme fluctuations in temperature and other conditions.

The gearbox 10 is generally sealed. This allows the gearbox 10 to be used in corrosive environments while limiting the impact of the environment on the internal components. For example, the various seals and gaskets on the gearbox can block water and contaminants from entering the gearbox, thus maintaining the gearbox in better condition and requiring fewer oil changes and other maintenance then may otherwise be required.

In addition to the outside conditions experienced by the gearbox 10, during use the internal gear oil may become hot and expand. This can increase the oil pressure. At other times, the gear oil may cool and contract, decreasing the oil pressure. For example, in many cities of the United States it is typical for the average difference between the high and low temperature of a typical summer day to be around 20-30° F. Other factors, such as rainfall, shade, direct sunlight, amount of use, etc. can increase the range of temperatures that a gearbox may experience in a day. Thus, during the course of a day, the gearbox can experience extreme swings in temperature and pressure. It has been found that this increased oil pressure can cause the seals 30 around the drive shaft and output shaft to fail, or to have a shortened life span therefore requiring early replacement. The pressure inside the gearbox has been found to increase by 5-7 psi which can force the seals against the drive shaft, causing the seals to wear faster due to the additional force. Not only do the seals have to be replaced earlier but oil can leak out of the gearbox because of the increased pressure.

An expansion chamber 50 can be provided to regulate the internal change of pressure. An elastomeric diaphragm 36 (e.g., rubber) can be used to create an expansion chamber within the gearbox 10. The expansion chamber 50 can help to prevent the seals 30, 32 from failing and the oil from leaking out of the gearbox. The diaphragm 36 can expand or contract to relieve changes in internal pressure. For example, when the gear oil becomes hot the oil expands, increasing the internal pressure. The diaphragm 36 can then also expand to relieve the pressure and reduce the stress on other components, such as seals and gaskets. The diaphragm 36 can be exposed to the atmosphere on the expansion chamber side and exposed to the internal pressure of the gearbox 10 on the other side. This can allow the diaphragm 36 to normalize the internal pressure of the gearbox 10 with atmospheric pressure.

The expansion chamber 50 can expose the diaphragm 36 to the atmosphere through a vent 48 or some other feature so as to not create a sealed chamber around the diaphragm 36. The diaphragm 36 can be used to relieve internal pressure in the gearbox 10 by expanding or contracting in response to a change in pressure inside the gearbox 10. The movement of the diaphragm can change the size of the chamber 50. The chamber 50 can expand or contract in one or more directions to normalize the pressure inside the gearbox 10 with the pressure outside the gearbox 10.

Having the diaphragm 36 or other expansion chamber inside the gearbox can provide certain benefits. For example, an elastomeric diaphragm can sit in a bath of gear oil which can increase the flexibility and the life of the diaphragm. Having the expansion chamber inside the gearbox does not require a separate cover to protect the expansion chamber. The gearbox cover 22 itself can cover and protect the expansion chamber. The expansion chamber 50 can be used to seal or otherwise separate the working portion of the gearbox 10 from the atmosphere. In some embodiments, the gearbox housing 12 can be completely filled with oil in order to reduce the chance that air is present within the working portion of the gearbox housing 12. Generally, fluctuations in temperature can result in the formation of water within gearbox housing 12, which can be detrimental to the operation of the gearbox 10. In some instances, the gearbox can be filled up such that all of the airspace is eliminated. By eliminating the airspace, the chance of water contamination of the oil is greatly reduced, which can extend the useful life of the oil and the gearbox. The expansion chamber 50 can contract and expand based on the operating conditions of the gearbox. The formation of water can be largely confined to the expansion chamber 50. The expansion chamber 50 can have a vent 48 regulate the pressure and an outlet port 54 to drain fluids, such as water, that can form during operation of the gearbox 10. The outlet port 54 can be used to inspect for oil and/or water within the expansion chamber 50 during usage of the gear box. The outlet port 54 can be used as a pressure relief during production to test to help prevent other vents from being blown out during testing. In some embodiments, the gearbox 10 may not include an outlet port 54.

The diaphragm 36 can be configured to be positioned inside the gearbox 10 and to relieve pressure build-up within the gearbox 10 caused from changes in temperature and the related thermal expansion or contraction of a volume of oil configured to be held within the outer casing. It has been found in testing that a gearbox without pressure relief experienced an increase of 6 psi with an oil temperature rise of 60.5 degrees F. A gearbox 10 with a diaphragm 36 under the same testing conditions experienced a reduced increase in pressure.

With reference again to FIG. 3, one method of positioning the diaphragm 36 inside the gearbox is shown. The diaphragm 36 can be positioned to be offset from the bull gear 18 or any other moving parts, such as the output shaft 20, so that it can expand and contract away from the moving parts. A flange 41 can help secure the diaphragm 36 to a back side of the gearbox cover 22. The gearbox cover 22 can also include an outer channel or groove 23 and an inner channel or groove 24. The channels 23, 24 extend circumferentially about the gearbox cover 22.

The diaphragm 36 or other type of device can be one of many different devices that can expand and contract in response to a pressure change. The diaphragm can be any of multiple shapes and sizes and can be connected to the gearbox 10 in many different ways. In the illustrated embodiment, the diaphragm 36 is substantially circular is positioned circumferentially around the output shaft 20. The diaphragm 36 completely encircles the output shaft 20. In some embodiments, the diaphragm 36 may only partially encircle the output shaft. For example, the diaphragm 36 may encircle less than 360 degrees, less than or equal to 270 degrees, less than or equal to 180 degrees, or less than or equal to 90 degrees of the output shaft 20. In some embodiments, the diaphragm may be divided up into multiple sections such that the diaphragm is not a single contiguous piece of material. The gearbox 10 may include multiple diaphragm sections that encircle the output shaft with gaps between each section. In some embodiments the diaphragm may have a non-circular configuration. For example, the diaphragm 36 may be sized and shaped to fit within portions or channels of the gearbox cover 22.

Figure 4A:
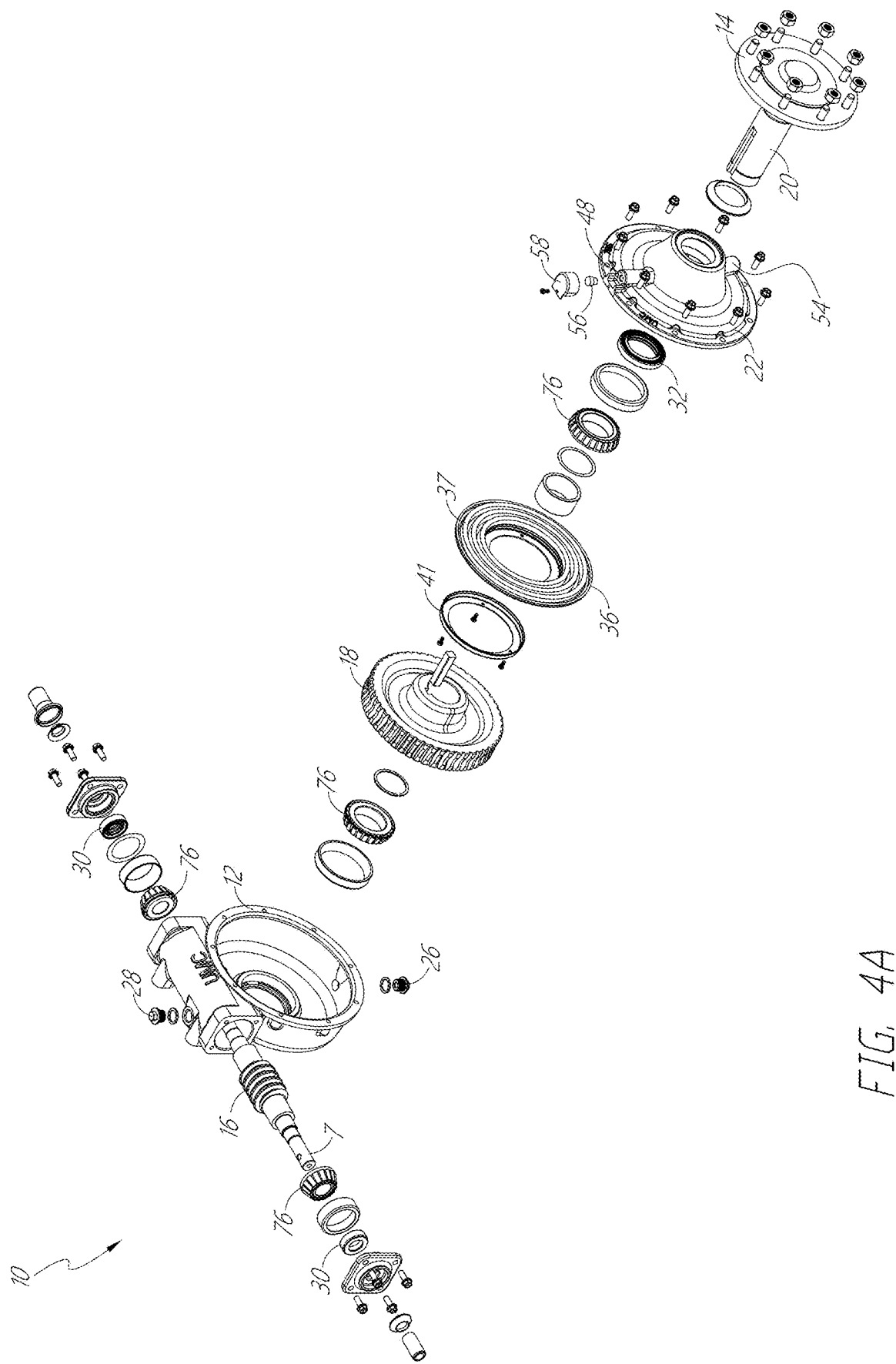
FIG. 4A illustrates a partially exploded view of the embodiment of the wheel gearbox.
Figure 4B:
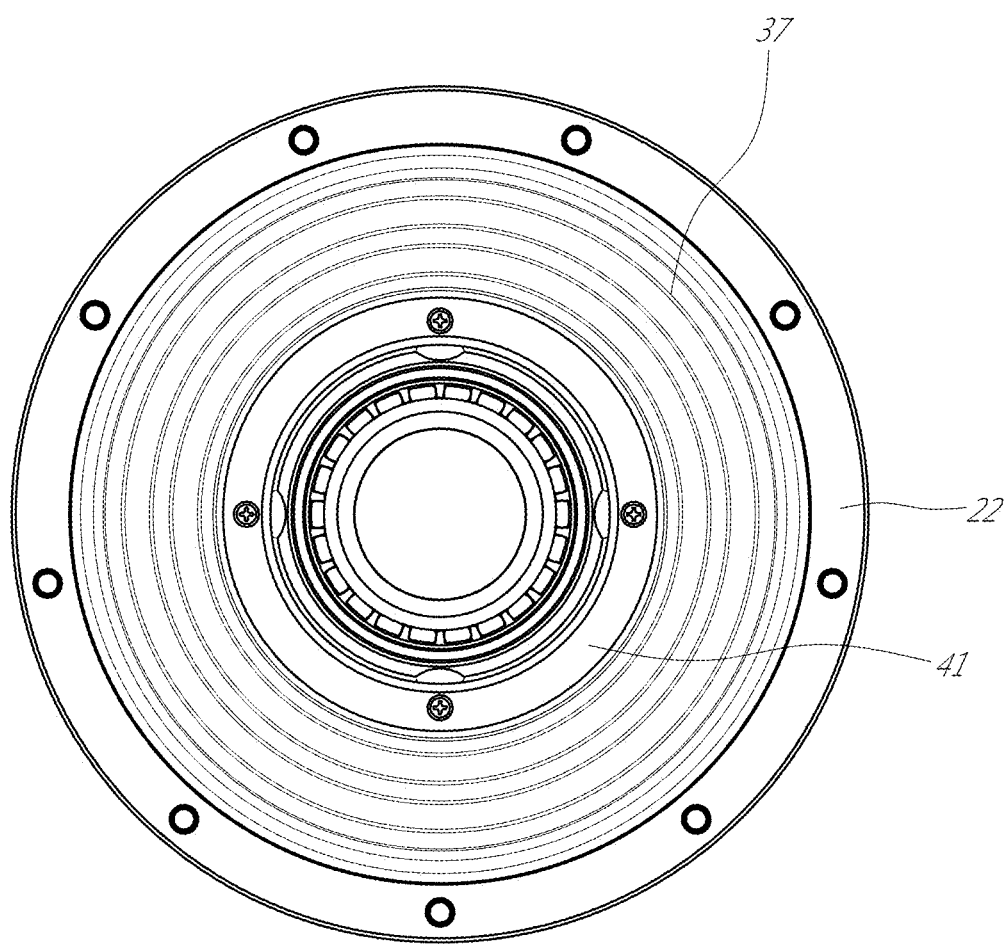
FIG. 4B illustrates a subassembly of the gearbox cover.
Figure 5:
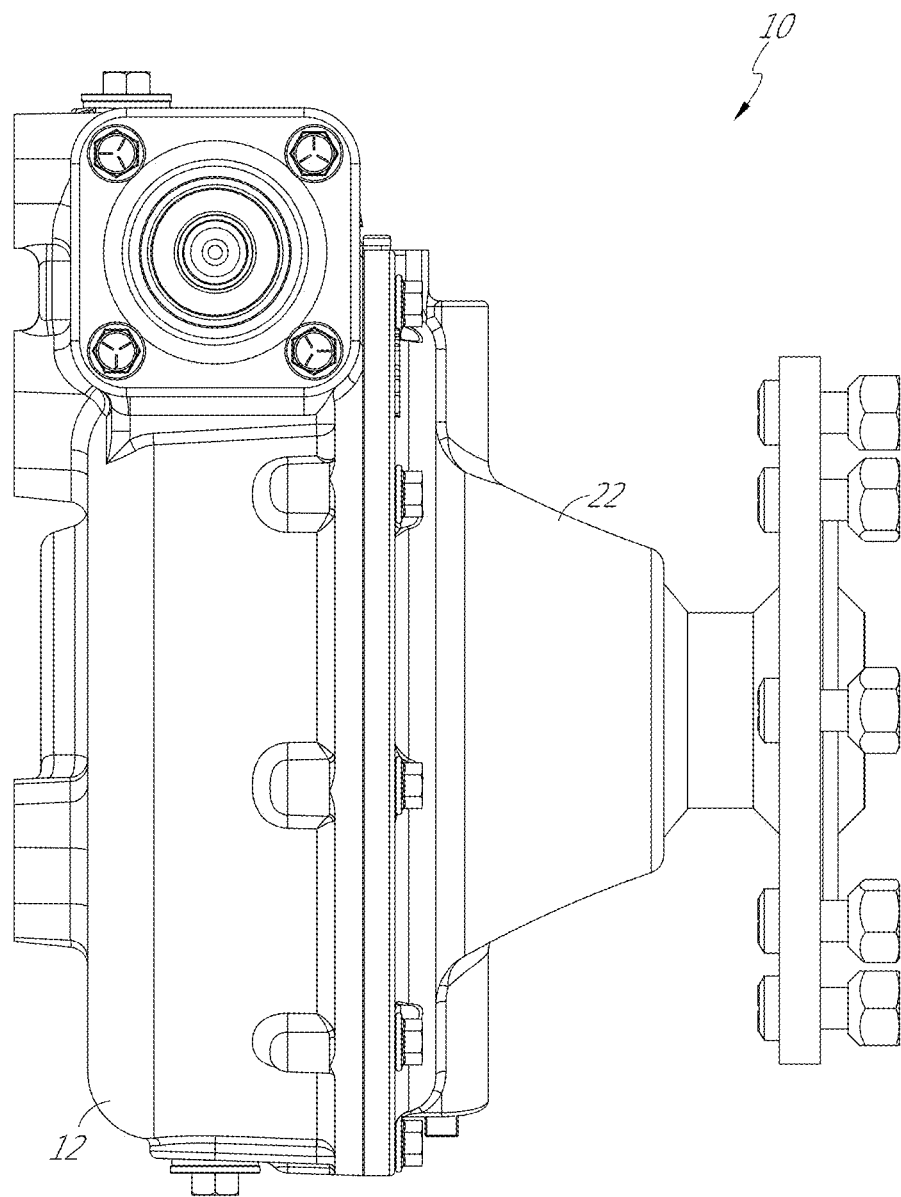
FIG. 5 is an assembled side view of the gearbox of FIG. 2.
Figure 6:
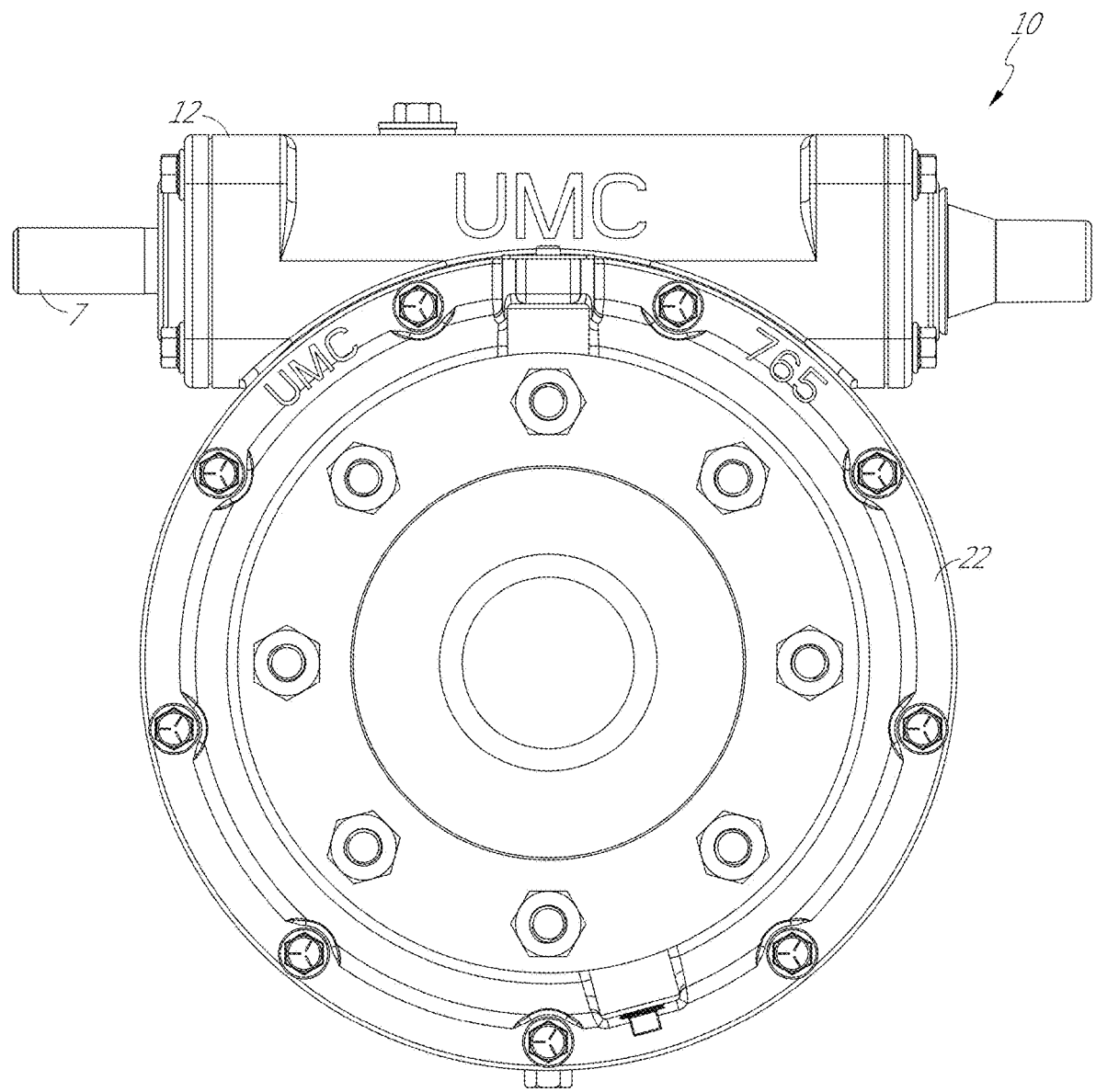
FIG. 6 is an assembled end view of the gearbox of FIG. 2.
Figure 7:
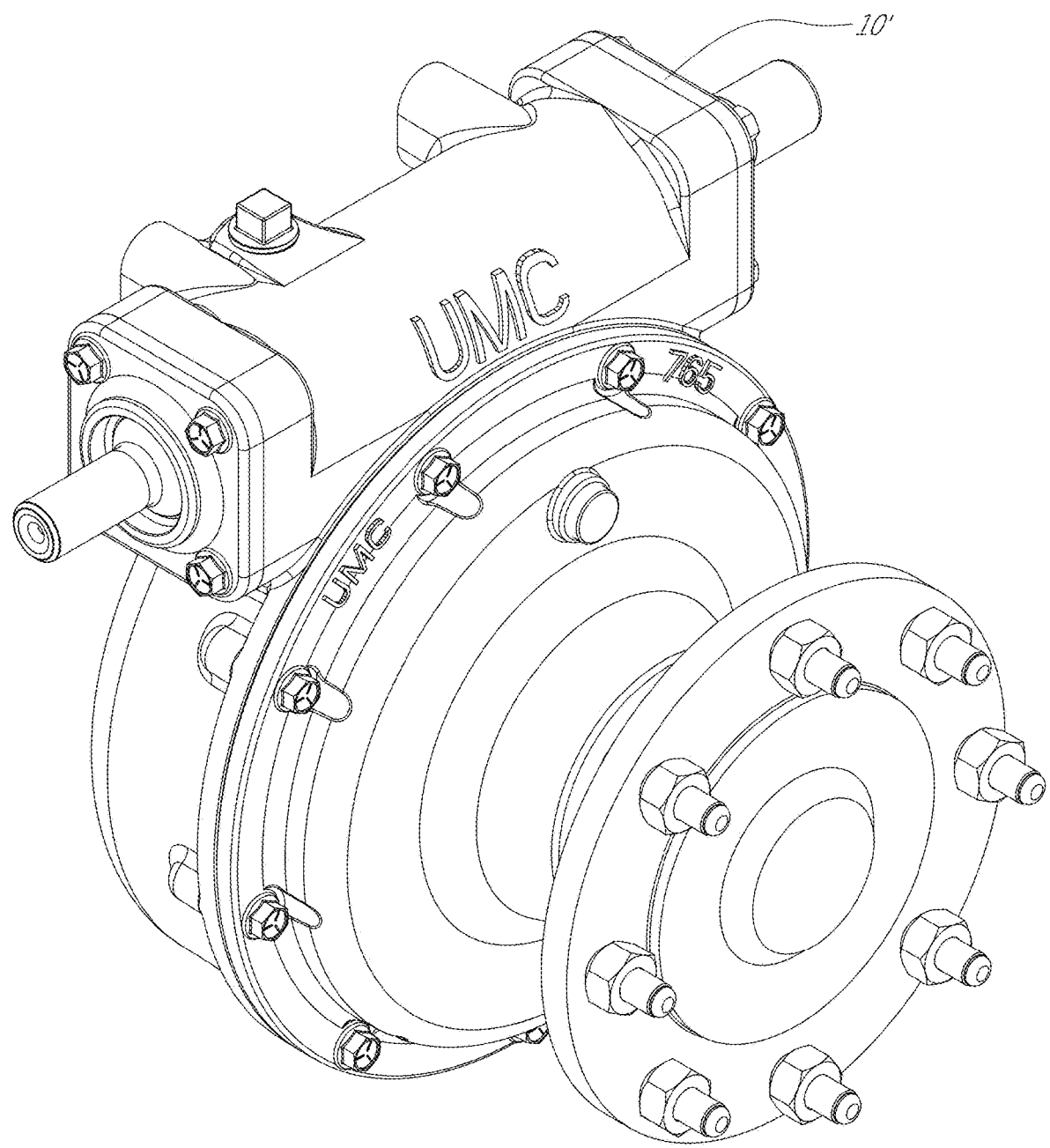
FIG. 7 illustrates another embodiment of a wheel gearbox.
Figure 8:
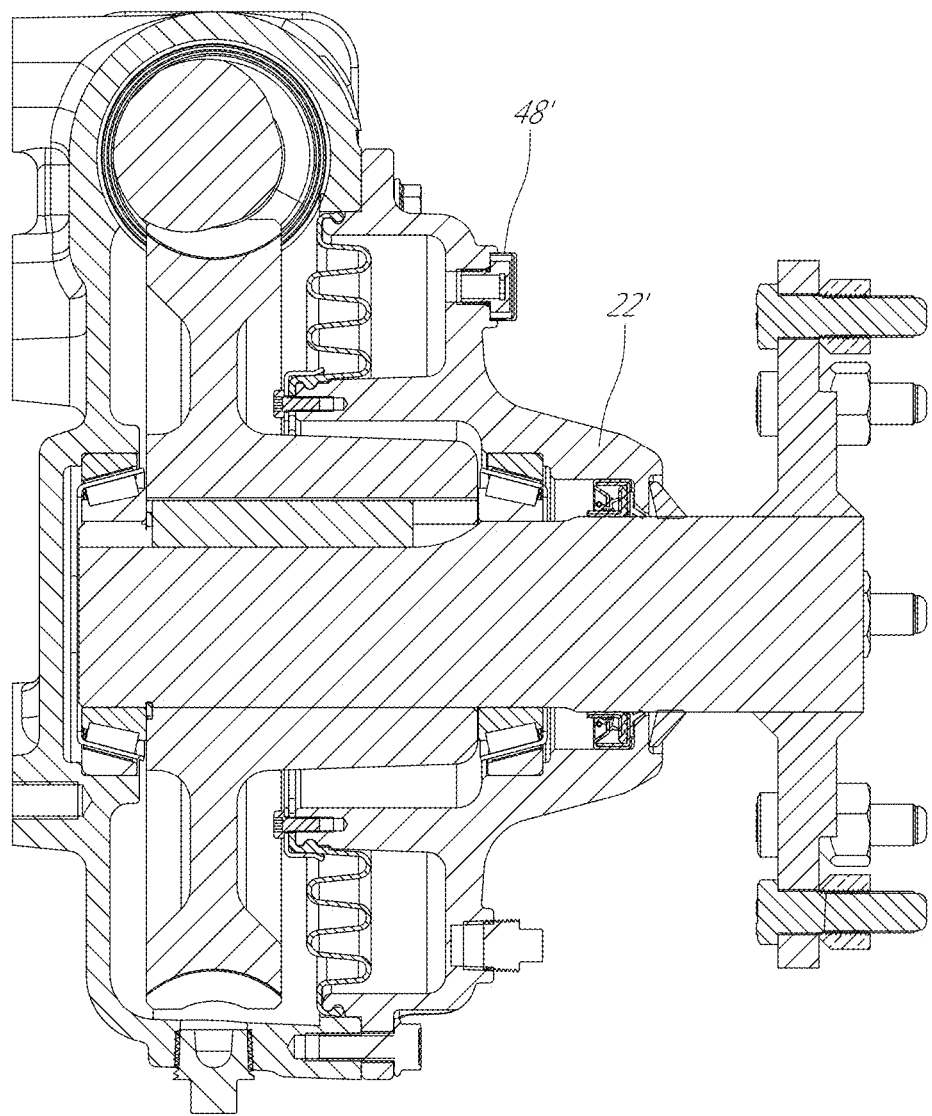
FIG. 8 illustrates a cross section of the gearbox of FIG. 7.
Figure 9:
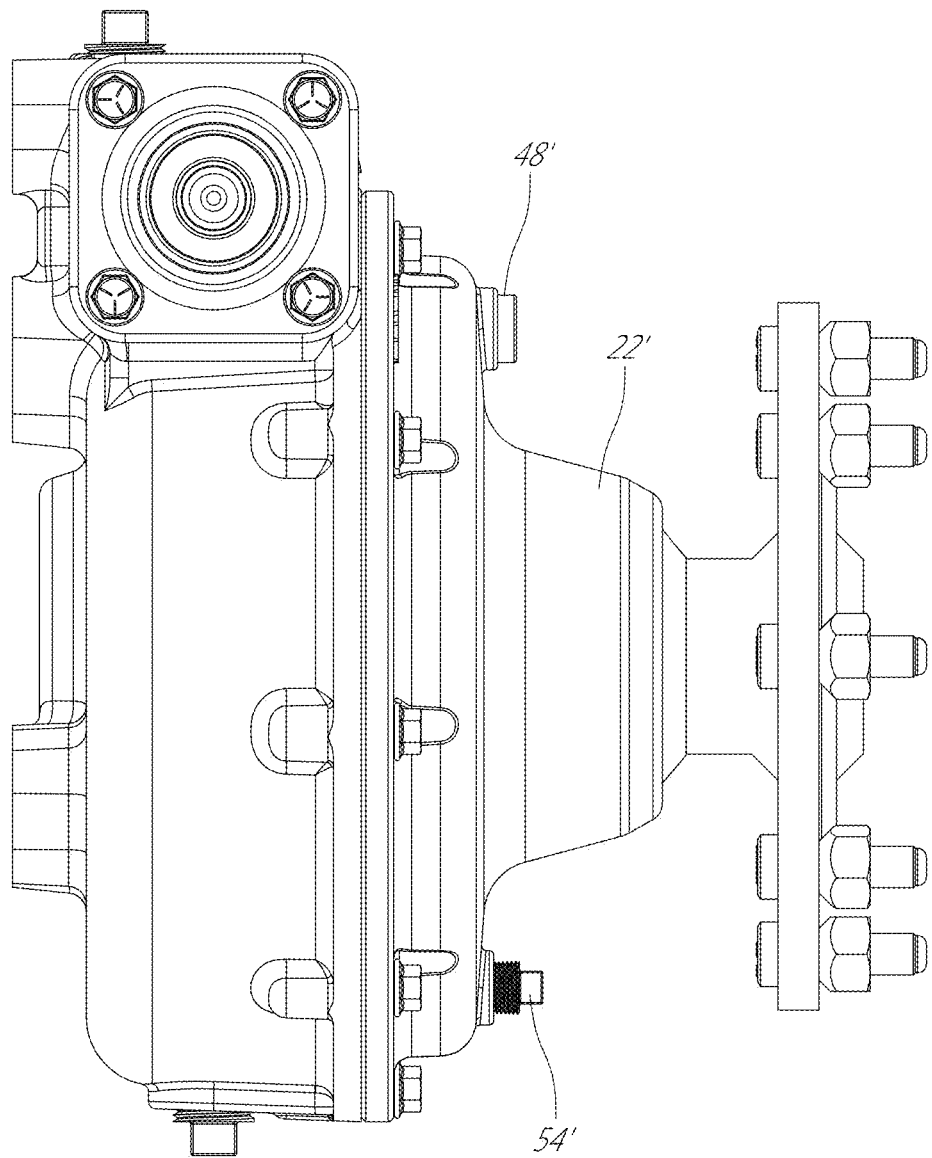
FIG. 9 is an assembled side view of the gearbox of FIG. 7.
Figure 10:
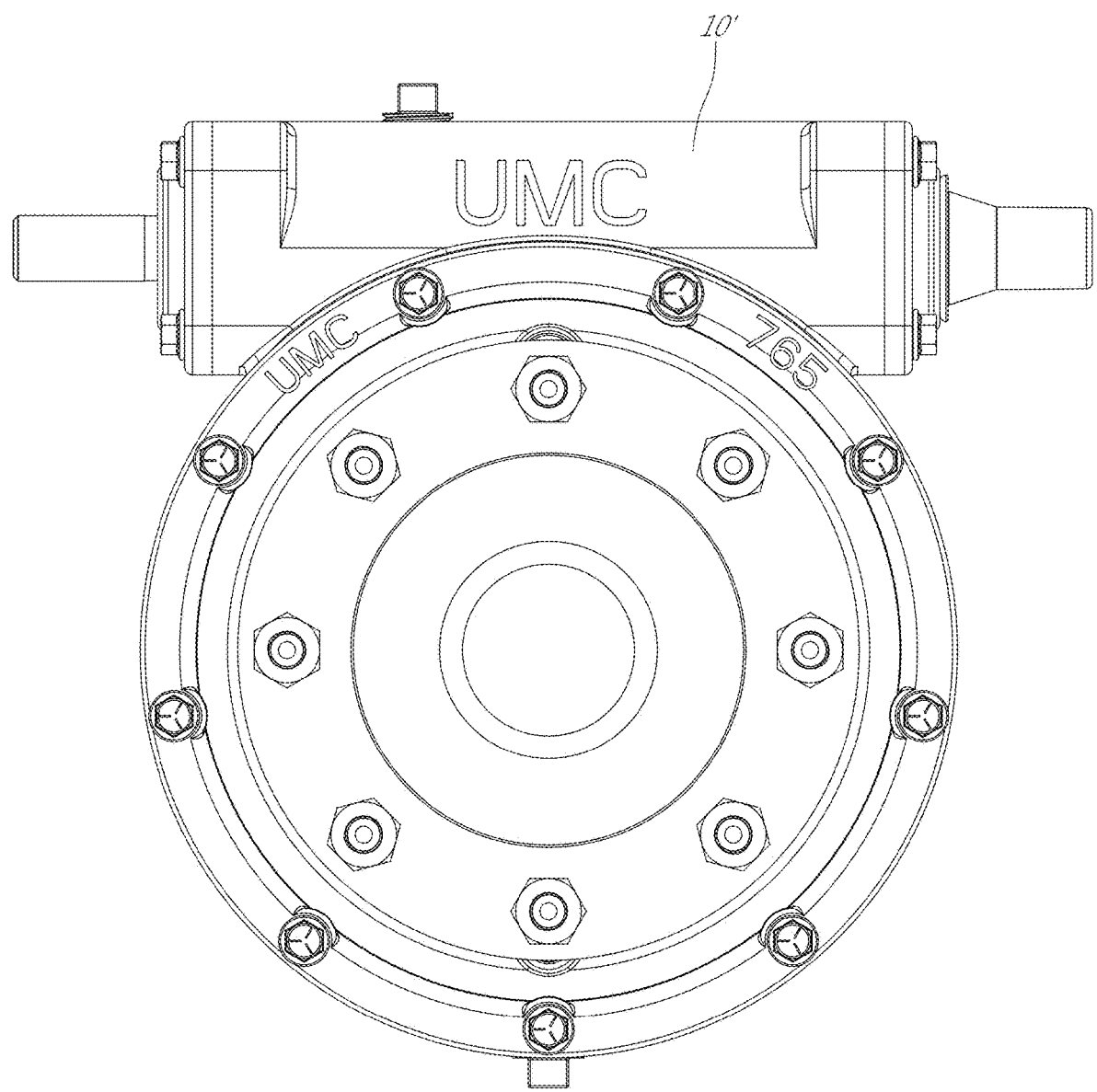
FIG. 10 is an assembled end view of the gearbox of FIG. 7.

In the illustrated embodiment, the diaphragm 36 has a wavy or undulating portion 37, engagement portions 38*a-b*, and a flap 39. As will be described in further detail below with respect to FIG. 12, the undulating portion 37 may be any shape or configuration. In some embodiments, the undulating section may be replaced by a flat section. The engagement portions 38*a-b* can be rounded protrusions that extend outward from the diaphragm and are sized and shaped to engage channels 23 and 24. The outer engagement portion 38*a* is configured to be positioned within the outer channel 23 and the inner engagement portion 38*b* is configured to be positioned within the inner channel 24. The engagement portions 38*a-b* can function as positioning and sealing elements to help position and seal the diaphragm within the gearbox cover 22. The diaphragm flap 39 can be sized and shaped to help secure the diaphragm 36 to the gearbox cover. The flap 39 can include a plurality of orifices that can be used to secure the flange 41 over the diaphragm flap and to the gearbox cover 22. With additional reference to FIG. 4B illustrates a view of a partial assembly of the gearbox cover 22 with the flange 41 securing the diaphragm to the gearbox cover.

The diaphragm 36 is configured to seal the expansion chamber 50 from the inside of the gearbox. The flap 39, flange 41, inner engagement portion 38*b*, and inner channel 24 can help to substantially seal the inner portion of the diaphragm 36. When the gearbox is assembled, the outer engagement portion 38*a*, which is positioned within the outer channel 23, is sandwiched between the gearbox housing 12 and the gearbox cover 22, which substantially seals the outer edge of the diaphragm. The outer seal can also help prevent oil from leaking out of the gearbox housing 12 at the seam between the housing and the cover 22.

The diaphragm prevents the air and/or water that accumulates within the expansion chamber from contaminating the oil within the gearbox housing 12. The diaphragm 36 is also positioned so that it will not expand or contract into any moving parts or be drawn into them. The position of the diaphragm 36 in FIG. 3 can illustrate a default, empty, or first configuration. The presence of oil or other lubricant can increase the pressure inside the housing and cause the diaphragm to contract or move away from the bull gear 18 to a second configuration. As the temperature and pressure increases or decreases, the diaphragm can assume other contracted or expanded positions.

In some instances it has been found that a diaphragm can be forced to move towards a worm gear or other moving part when it is facing the gear or part. For example, in cold conditions a vacuum can be created as the worm gear rotates. This vacuum can cause a diaphragm to move towards the worm gear. This undesirable effect can prevent the diaphragm from functioning properly. The diaphragm can be positioned at defined distances from moving parts, such as the bull gear 18 and output shaft 20, in order to prevent undesirable effects caused by movement of the diaphragm within the gearbox.

The chamber 50, formed by the diaphragm 36 and the gearbox cover 22 can be vented to the outside through a vent 48. This can allow the expansion chamber 50 to be inside the gearbox 10 and yet exposed to the outside atmosphere and properly compensate for a change in pressure within the gearbox 10. Though not readily apparent from the figures, the expansion chamber 50 can be a contiguous chamber that completely encircles the output shaft 20. The chamber can have a substantially uniform cross sectional size and shape, such as illustrated by the portions of the chamber 20 illustrated in FIG. 3. In some embodiments, the cross sectional shape of the chamber may vary within the gearbox. In some embodiments, the expansion chamber may be divided into plurality of isolated sections with each section having a separate vent.

The vent 48 can take many forms. For example, the vent 48 can have a filter 56 and a cap 58. From the chamber 50, air can flow through the vent, then through the filter 56 into the cap 58 and then out into the atmosphere.

The vent 48 can be configured in such as way as to allow air flow through the channels and substantially prevent other flows such as water, mud, etc. through the vent. For example, configuring the vent to have a tortuous path can help prevent water and other material from entering the vent 48 and the chamber 50. In addition, a filter 56 can further help prevent material from entering the chamber 50. An example filter 56 is a screw-in vent with internal filter labeled as a POV/metal vent, available from W. L. Gore & Associates, of Newark, Del. In addition a cap 58 can be used to cover the filter 56, to protect it and to add additional turns in the vent path.

FIGS. 7-10 illustrate an alternative embodiment of the gearbox 10' that includes different embodiments of the vent 48' and outlet port 54'. The gearbox operates as described above. In the illustrated embodiment, the vent 48' and the outlet port 54' extend outwards through the gearbox cover 22' and are substantially parallel to the output shaft 20.

Figure 11A:
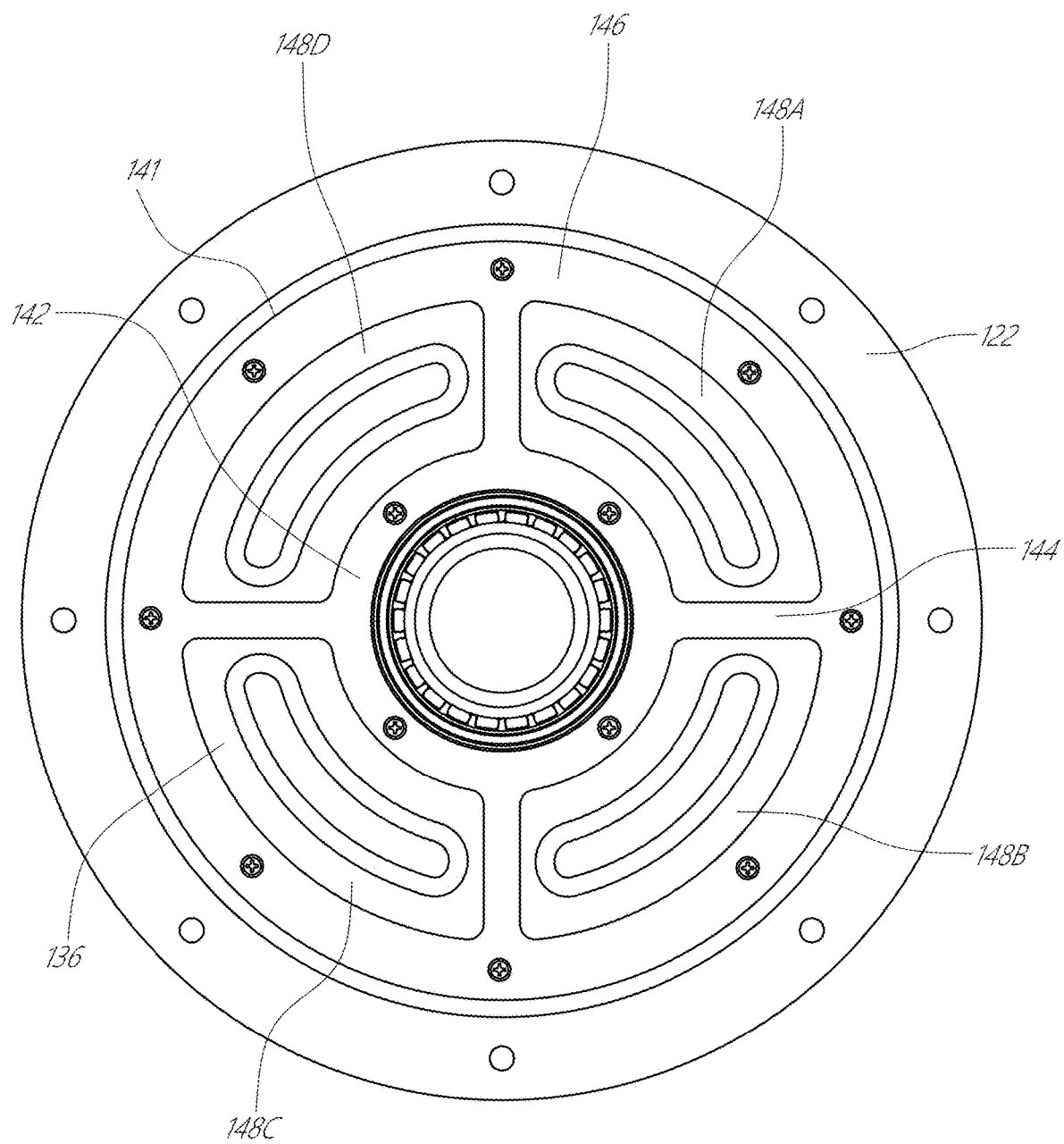
FIG. 11A illustrates an another embodiment of a flange for securing a diaphragm to the gearbox cover.
Figure 11B:
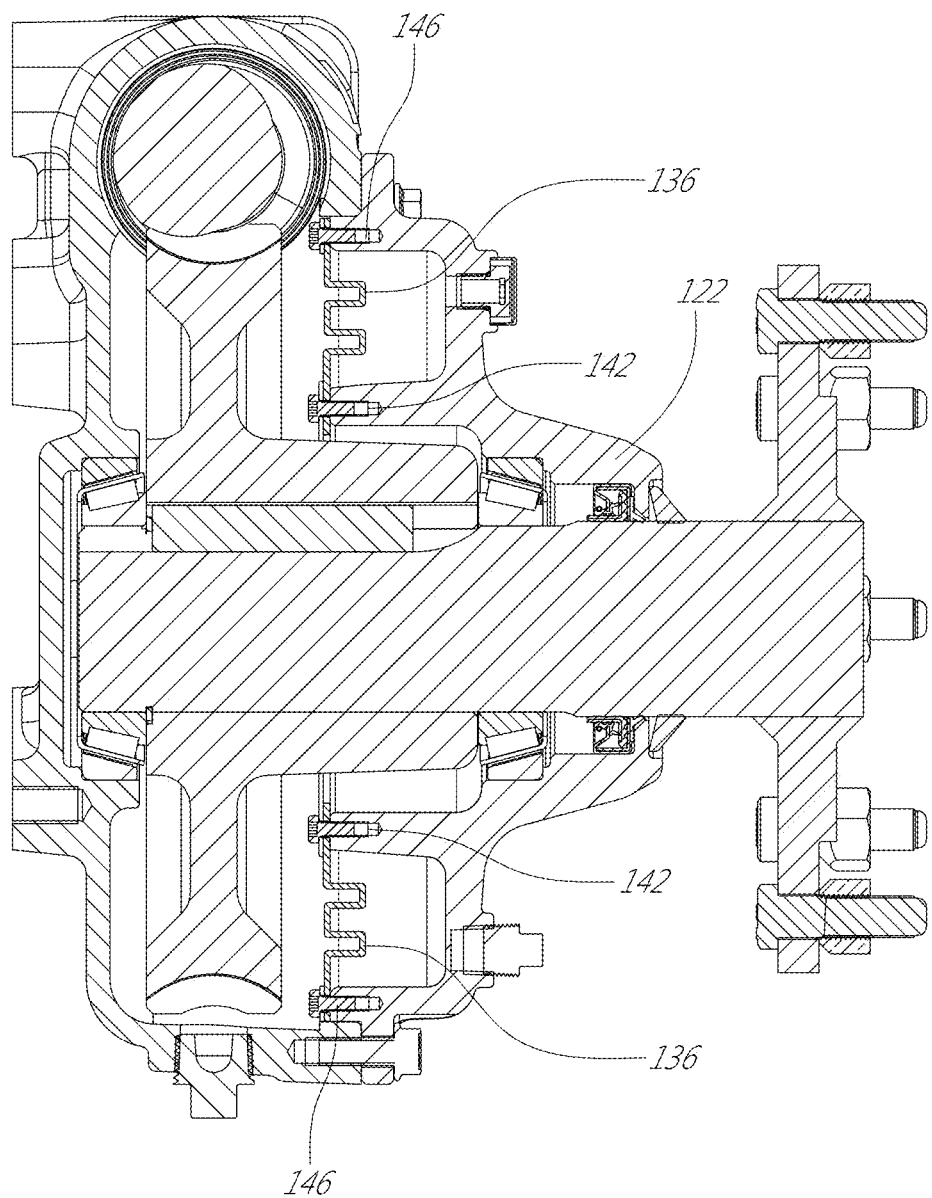
FIG. 11B illustrates a cross section of another embodiment of the gearbox with the flange of FIG. 11A.

FIGS. 11A and 11B illustrates an another embodiment of a flange 141 for securing a diaphragm 136 to the gearbox cover 122. In the illustrated embodiment, the flange 141 can include an inner portion 142, arm portions 144, and an outer portion 146. The arm portions 144 connect the inner portion 142 and the outer portion 146. The flange can be formed from multiple pieces or a single piece of material and can include a plurality of holes or orifices for securing the flange 141 to the gearbox cover 122. The flange 141 is configured to form sections 148A-D, also referred to as expansion zones 148. The illustrated embodiment includes four sections. Other embodiments can have any number of sections, different orientations, each section can be uniformly shaped and sized, and/or have different shapes and sizes. The diaphragm 136 can be configured to be sandwiched between the flange 141 and the gearbox cover 122.

Figure 12A:
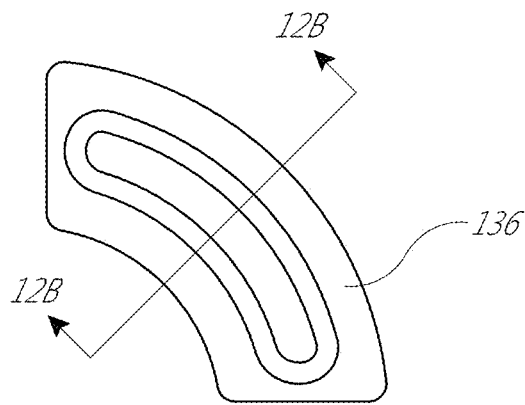
FIGS. 12A-12E illustrate embodiments of diaphragms.
Figure 12B:
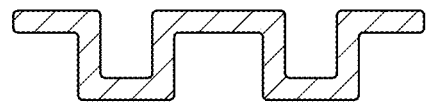
Figure 12C:
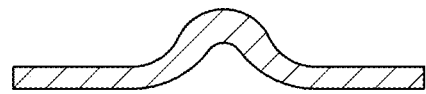
Figure 12D:
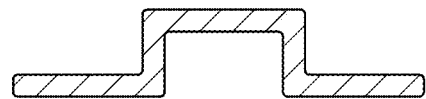
Figure 12E:

The flange 141 can be configured to help support the diaphragm 136 and limit travel of the diaphragm 136 during expansion and contraction. The divisions of the diaphragm 136 into expansion zones help isolate each zone and control the amount of travel of the diaphragm 136 within the zone. Various factors can help to control the amount of travel of the diaphragm, such as the shape of the flange, the size, shape, and configuration of the diaphragm in each zone, the material, and/or other factors. Each zone 148 of the diaphragm 136 can have a defined shape. An example embodiment of a zone 148 of the diaphragm 136 is illustrated in FIG. 12A. FIGS. 12B-12E illustrated various embodiments cross sectional shapes of the diaphragm. An expansion zone of the diaphragm can have any cross sectional shape or configuration. In some embodiments, the diaphragm 140 can be flat.

Additionally, the flange 141 can help to improve assembly of the gearbox. The flange 141 can be configured to seal the expansion chamber 50 within the gearbox cover 122 independent of the gearbox housing 12. The flange 141 can mount directly on the gearbox cover and does not need to come in contact with the housing. This can provide for a modular assembly of the gearbox 10 where the gearbox cover can be assembled and tested without requiring attachment of the housing 12.

In certain embodiments, the gearbox 10 can further include one or more sensor ports (not shown). A sensor can be positioned within the sensor port. In some embodiments, when the sensor port is not in use by a sensor, the port can be capped off or plugged. It may be desired to have certain sensors in certain gearboxes in an irrigation system while other gearboxes do not have sensors or have different sensors.

The sensor(s) can comprise at least one of any number of sensors including sensors to measure or detect: temperature, oil level, moisture, pressure, conductivity, etc. A temperature sensor can measure the temperature within the gearbox, for example the temperature of the gear oil within the gearbox. An oil level sensor can measure the level of the oil within the gearbox. A moisture sensor or hydrometer can detect the presence of moisture, or water within the gearbox. A conductivity sensor can detect the presence of metal shavings. These sensors can also be used for other purposes and other sensors can be used for these same and for different purposes. According to certain embodiments, the sensors are oil compatible and can operate in temperature ranges between 30-180 degrees F.

In some embodiments, the sensor can be configured to transmit information by wire or wirelessly. For example, a transmitter can be located on or near the gearbox 10. The transmitter can receive information from the sensor. This information can be transmitted from the transmitter periodically or on a real time basis to a receiver or central computer or monitor and can be transmitted via wires, radio wave, cell phone, etc. The transmitter and/or the sensors can be powered through various methods including electrical connections, battery, generator, etc.

The sensor can be connected with wires or wirelessly to a computer control. The computer control can display, relay, or store information from the sensor for present or future use. The control can be part of the gearbox or a separate unit. For example, on a central pivot irrigation system, a control can be located at the pivot which can collect information from one or more sensors, from one or more gearboxes on the system. In some embodiments, a monitoring system can be established to enable a user, such as a farmer to monitor the information from the sensors at a central location independent of the location of the sensors. The monitoring system can interact with the control(s) or it may interact directly with the sensor(s).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements, and/or states are in any way required for one or more embodiments or that one or more embodiments necessarily include these features, elements, and/or states.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

While the above detailed description may have shown, described, and pointed out novel features as applied to various embodiments, it may be understood that various omissions, substitutions, and/or changes in the form and details of any particular embodiment may be made without departing from the spirit of the disclosure. As may be recognized, certain embodiments may be embodied within a form that does not provide all of the features and benefits set forth herein, as some features may be used or practiced separately from others.

Additionally, features described in connection with one embodiment can be incorporated into another of the disclosed embodiments, even if not expressly discussed herein, and embodiments having the combination of features still fall within the scope of the disclosure. For example, features described above in connection with one embodiment can be used with a different embodiment described herein and the combination still fall within the scope of the disclosure.

It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this disclosure may comprise, additional to its essential features described herein, one or more features as described herein from each other embodiment disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added.

Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Unless the context clearly requires otherwise, throughout the description and the claims, the words "comprise", "comprising", and the like, are to be construed in an inclusive sense as opposed to an exclusive or exhaustive sense, that is to say, in the sense of "including, but not limited to".

Reference to any prior art in this description is not, and should not be taken as, an acknowledgement or any form of suggestion that that prior art forms part of the common general knowledge in the field of endeavor in any country in the world.

The invention may also be said broadly to consist in the parts, elements and features referred to or indicated in the description of the application, individually or collectively, in any or all combinations of two or more of said parts, elements, or features.

Where, in the foregoing description, reference has been made to integers or components having known equivalents thereof, those integers are herein incorporated as if individually set forth. In addition, where the term "substantially" or any of its variants have been used as a word of approximation adjacent to a numerical value or range, it is intended to provide sufficient flexibility in the adjacent numerical value or range that encompasses standard manufacturing tolerances and/or rounding to the next significant figure, whichever is greater.

It should be noted that various changes and modifications to the presently preferred embodiments described herein will be apparent to those skilled in the art. Such changes and modifications may be made without departing from the spirit and scope of the invention and without diminishing its attendant advantages. For instance, various components may be repositioned as desired. It is therefore intended that such changes and modifications be included within the scope of the invention. Moreover, not all of the features, aspects, and advantages are necessarily required to practice the present invention. Accordingly, the scope of the present invention is intended to be defined only by the claims.

What is claimed is:

1. A gearbox for an irrigation system comprising:
   a housing;
   an output shaft;
   a worm gear within the housing;
   a bull gear within the housing and configured to be engaged with the worm gear and drive the output shaft;
   a diaphragm positioned within the housing defining a first chamber fluidically sealed from a second chamber, the diaphragm configured for expansion and contraction and configured to be positioned inside the housing to regulate pressure within the housing, wherein the diaphragm extends circumferentially around at least a portion of the output shaft; and
   a vent configured to allow air to flow between the atmosphere and the first chamber.

2. The gearbox of claim 1 further comprising a sealable outlet port that connects to the first chamber.

3. The gearbox of claim 2, wherein the outlet port is configured to drain fluids from the first chamber.

4. The gearbox of claim 1, wherein the worm gear and the bull gear are disposed within the second chamber that is separate from the first chamber.

5. The gearbox of claim 4, wherein the diaphragm is configured to fluidically separate a lubricant disposed within the second chamber from the first chamber.

6. The gearbox of claim 1, wherein the diaphragm extends circumferentially around the entire output shaft.

7. The gearbox of claim 1, wherein the diaphragm comprises two or more portions.

8. The gearbox of claim 1, wherein the housing further comprises:
   a housing body; and
   a housing cover, wherein the first chamber is disposed within the housing cover.

9. The gearbox of claim 8, wherein a retention member secures the diaphragm to the housing cover, wherein the retention member is configured to fluidically seal the first chamber within the housing cover.

10. The gearbox of claim 9, wherein the retention member defines a plurality of expansion zones of the diaphragm, wherein the retention member is configured to limit movement of the diaphragm.

11. The gearbox of claim 8, wherein an outer edge of the diaphragm is secured between the housing cover and the housing body, and a retention member secures an inner edge of the diaphragm to the housing cover, wherein the retention member in conjunction with the housing body is configured to fluidically seal the first chamber within the housing cover.

12. The gearbox of claim 1, wherein the diaphragm comprises an undulating section.

13. The gearbox of claim 1, wherein the diaphragm comprises an undulating section configured for expansion and contraction.

14. A gearbox for an irrigation system comprising:
   a housing;
   an output shaft;
   a worm gear within the housing;
   a bull gear within the housing and configured to be engaged with the worm gear and drive the output shaft; and
   a diaphragm positioned within the housing and extends circumferentially around the entire output shaft, the diaphragm defining a first chamber fluidically sealed from a second chamber, the first chamber configured for expansion and contraction and configured to be positioned inside the housing to regulate pressure within the housing;
   wherein the second chamber is configured to be filled with a lubricant during operation of the gearbox, wherein the worm gear and bull gear are positioned within the second chamber.

* * * * *